United States Patent [19]

Bennett et al.

[11] Patent Number: 4,469,761

[45] Date of Patent: Sep. 4, 1984

[54] RECHARGEABLE LITHIUM/SULFUR AMMONIATE BATTERY

[75] Inventors: John E. Bennett, Painesville; David E. Harney; Thomas A. Mitchell, both of Mentor, all of Ohio

[73] Assignee: Diamond Shamrock Corporation, Dallas, Tex.

[21] Appl. No.: 405,882

[22] Filed: Sep. 20, 1982

Related U.S. Application Data

[63] Continuation-in-part of Ser. No. 210,739, Nov. 26, 1980, abandoned.

[51] Int. Cl.³ .......................................... H01M 10/44
[52] U.S. Cl. ..................................... 429/50; 429/104; 429/105; 429/174; 429/185
[58] Field of Search ................. 429/50, 105, 101, 104, 429/174, 185

[56] References Cited

U.S. PATENT DOCUMENTS

| | | | |
|---|---|---|---|
| 2,996,562 | 8/1961 | Meyers | 136/6 |
| 3,573,987 | 4/1971 | Knight | 136/83 |
| 4,002,807 | 1/1977 | Ludwig | 429/104 |
| 4,093,527 | 6/1978 | Tanno et al. | 204/129 |
| 4,154,902 | 5/1979 | Schwartz | 429/15 |
| 4,296,184 | 10/1981 | Stachurski | 429/14 |
| 4,311,771 | 1/1982 | Walther | 429/51 |

Primary Examiner—Charles F. LeFevour
Attorney, Agent, or Firm—Woodrow W. Ban; Arthur S. Collins

[57] ABSTRACT

A rechargeable ambient temperature electrical storage cell utilizing an alkali metal or alkaline earth metal and sulfur electrochemical reaction pair. The cell includes an anhdyrous liquid anode separated from an anhydrous, sulfur containing catholyte by a cationic permeable partition.

18 Claims, 4 Drawing Figures

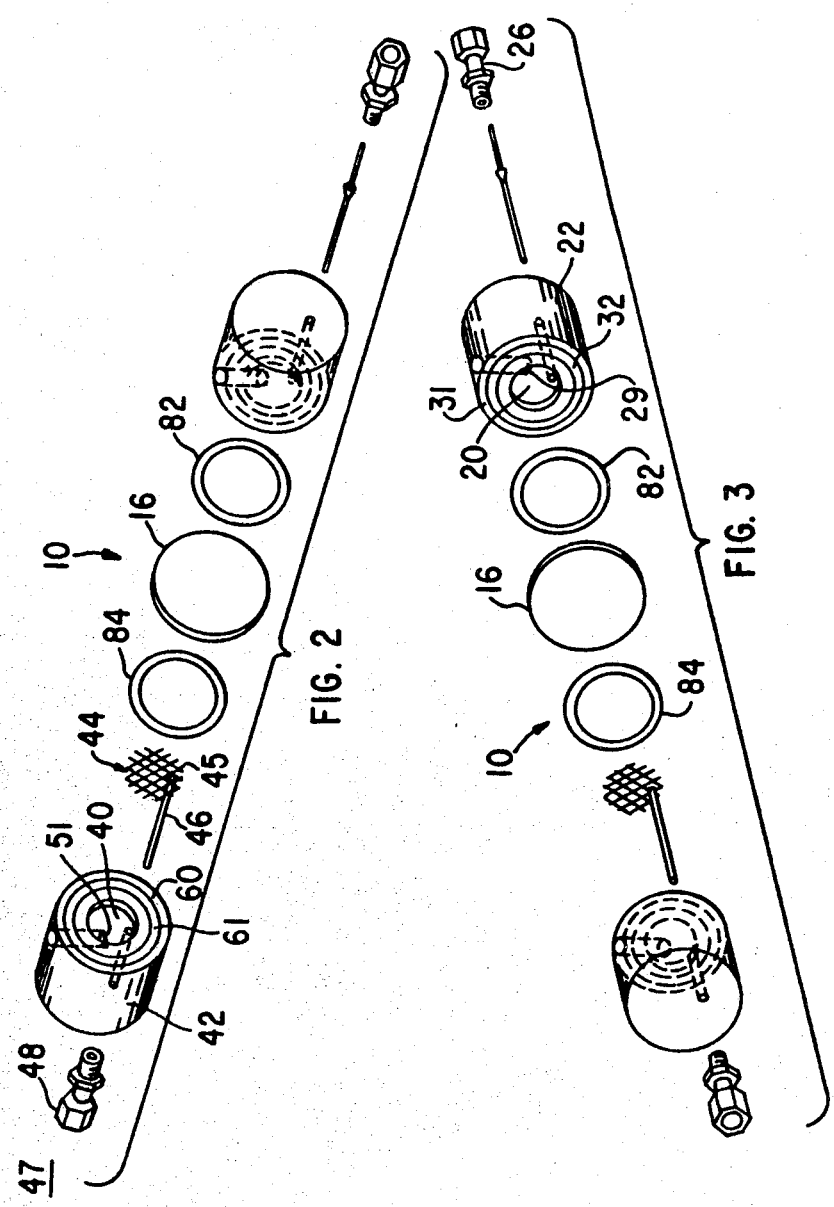

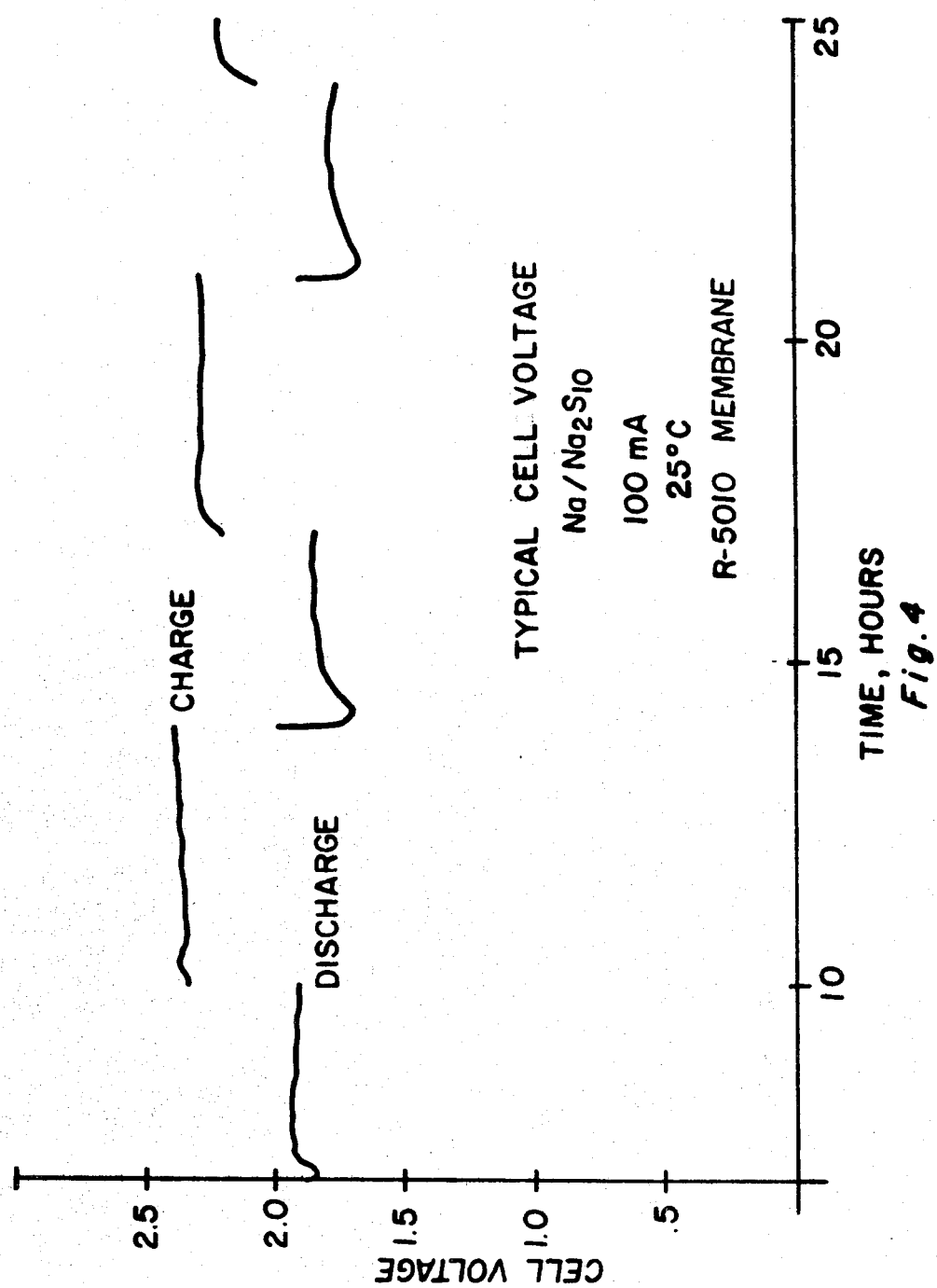

RECHARGEABLE LITHIUM/SULFUR AMMONIATE BATTERY

PRIOR APPLICATION DATA

This application is a continuation in part of U.S. patent application Ser. No. 210,739 filed Nov. 26, 1980, abandoned.

FIELD OF THE INVENTION

This invention relates to electrical current storage batteries and more specifically to an apparatus and method for a rechargeable electrical current storage cell utilizing a reversible electrochemical reaction between an alkali or alkaline earth metal and sulfur for the storage and release of an electrical current.

BACKGROUND ART

The basic concept of chemical generation and storage of electricity is quite old. Batteries can be traced to 1795 when Volta discovered that two dissimilar metals, placed in an electrically conductive fluid establish an electromotive force from which an electric current can be tapped. Various materials employed as electrodes, a variety of electrolyte possibilities, and numerous combinations of electrodes and electrolytes subsequently have been the object of considerable experimentation for nearly 200 years.

Electrochemical cells generate power when two energetic materials participate in a controlled oxidation-reduction reaction occurring in an ionically conductive electrolyte. Electrons are transferred in the reaction, and these transferred electrons are collected and distributed by a pair of electrodes generally fabricated from metal, carbon, or the like. Electrons collected at one cell electrode are generally passed through an electrical load circuitry before being returned to the other electrode.

There are two basic electrochemical cell types. Secondary, or rechargeable cells generate electrical energy until some unacceptably low power output is reached caused by depletion of the reactants. Electrical current flow through the cell is thereupon reversed to cause a reversal of the oxidation reduction reaction by which the cell generates power. When a suitable portion of the cell reactants have undergone the reverse reaction, the cell is "recharged" and ready again to provide energy.

Primary cells generate power identically by an oxidation reduction until the reactants contained within the cell have essentially become spent. However, for a variety of reasons having their roots in the nature of the cell reaction or the cell physical configuration, current reversal to recharge the battery is not practical, and the cell is discarded or perhaps recycled.

In much battery development, emphasis has traditionally focused upon locating reactants producing a large amount of energy for a given reactant weight and volume. In addition, it has been necessary to locate conductive electrolytes, chemically compatible with the reactants. However, in larger rechargeable batteries, emphasis has traditionally focused upon improvements to battery electrodes and electrolytes aimed at producing a reasonably efficient battery at very low cost. As a result of this emphasis, these batteries have frequently incorporated individual electrochemical reactants to generate the electromotive energy producing relatively small amounts of energy for a given weight of reactants. As a result of such a low ratio of evolved energy to weight, relatively large amounts of the reactants necessarily have been included in these rechargeable batteries to produce a desired current over a required period of time. For example, according to theoretical calculations, the energy density capability of a lead acid storage battery is about 200 watt-hours per kilogram of reactants.

More recently, in an effort to develop transportation alternates for use in an impending world oil shortage, attempts have been made to power automotive vehicles utilizing electrically powered drive trains drawing electricity from storage batteries contained within the automotive vehicle. An automotive vehicle driven utilizing power provided by batteries carried within the vehicle is transporting the weight of not only the vehicle and its contents, but also of the storage batteries. It is known that vehicle efficiency is strongly dependent upon the weight carried within the vehicle. It has been found that automotive vehicles driven utilizing electrical current from conventional storage batteries having a relatively low energy density generally are not satisfactory. A conventional storage battery providing sufficient electrical current to operate a reasonable commodious automotive vehicle at acceptable speeds and over an acceptable distance is necessarily so weighty that efficient vehicle operation is impaired seriously.

Various attempts have been made to develop a rechargeable storage battery providing a relatively large amount of electromotive energy per unit weight of the battery. Those skilled in the art, referring to the Periodic Table of Elements, have long recognized the alkali and alkaline earth metals and sulfur as possessing the desirable high energy and low weight characteristics. Electrochemical reactions between lower atomic weight alkali metals and sulfur and between lower atomic weight alkaline earth metals and sulfur have long been recognized as potentially providing relatively large energies of reaction from reactants of attractively low weight. For example, according to theoretical calculations, a lithium sulfur battery can produce 2600 watt-hours of energy per kilogram of reactants, a lithium iron disulfide battery about 1100 watt-hours.

A number of proposals have attempted to pair alkali or alkaline earth metals with sulfur to produce an efficient storage battery. Many of these proposals have related to primary batteries, that is, batteries designed to use the electrochemical energy of freshly activated battery reactants only once; recharging of these batteries not being contemplated. Alkali or alkaline earth metals reacting with sulfur in such primary batteries have been found to provide acceptable primary battery performance, particularly where an anhydrous electrolyte such as ammonia has been used in the battery. Under anhydrous conditions batteries utilizing, for example, a lithium-sulfur electrochemical reaction pair will produce adequate electrical voltage at operating temperatures significantly below those where an aqueous battery would have become nearly dormant.

Previous proposals for rechargeable batteries utilizing an electrochemical reaction pair involving an alkali or alkaline earth metal and sulfur have proven less satisfactory.

In one proposal, sodium and molten sulfur have been selected as the oxidation reduction reactants. However, the high temperature required in these sodium sulfur batteries has caused serious practical difficulties associated with both heat insulation, particularly of buses and bus connections, and the make-up supply of heat during periods of extended battery dormancy. Battery housing materials, by necessity, must resist both the elevated temperature and corrosive attack from the reactants. Impurities such as moisture are generally severely disfunctional to these batteries.

In another high temperature battery, lithium and iron disulfide in a molten salt electrolyte comprise the reactant pair. Beyond the same problems associated with high temperature sodium sulfur batteries, these lithium-iron disulfide cells can suffer from temperature induced iron disulfide instability and short cycle lives attributable at least in part to material migration difficulties.

There have been proposals from the use of an alkali, or alkaline earth metal sulfur, cell-oxidation reduction reaction at ambient temperature. In one such proposal, alkali metal-sulfur electrochemical reaction pairs such as lithium-titanium disulfide or lithium-sulfur have been utilized in combination with organically based electrolytes including dissolved salts. Short cycle lives of such batteries combined with a slow reaction between the organic electrolyte and the alkali metals such as lithium or sodium have dampened development of such batteries. Further, no wholly satisfactory organic electrolyte has yet been found particularly with respect to ionic conductivity. A low ionic conductivity tends not to support adequate cell discharge rates.

In another proposal, electrochemical batteries have utilized a cation producing alkali or alkaline earth metal anode and sulfur cathode together with an electrolyte solute such as an inorganic nitrate or perchlorate of the metal cation dissolved in a cell fluid such as ammonia. Such cells or batteries have demonstrated a capability of being recharged but also have demonstrated rapid decay in cell performance as measured by a reduced current and voltage output of the cell with each subsequent recharging. This decay in cell performance has been attributed to competing reactions between the chemical reactants within the cell, thereby reducing the quantity of chemicals available for storage of current.

It has been further proposed that such cells be divided to separate cell chemical components from one another in an effort to reduce the competing reactions between the electrochemical components. Division has not yet produced a wholly effective rechargeable alkali metal or alkaline earth metal-sulfur battery cell. One significant factor interfering with effective divided cell performance has centered about difficulties in finding a satisfactory divider material that resists destructive effects of fluids in the cell and yet passes metal cations. Another factor has been lack of a suitable supporting electrolyte for use in the cells that does not contribute significantly to competing cell reactions.

Water has long been a favored electrolyte solvent for use in rechargeable batteries. Water has not proven successful as an electrolyte solvent for batteries utilizing alkali and alkaline earth metal-sulfur reactions. Many of the metals react violently with water, and most forms of sulfur useful in the battery reaction are at best insufficiently soluble in the water.

Liquid ammonia exhibits many of the properties that make water a highly desirable battery electrolyte solvent. $NH_3$ is highly hydrogen bonded, resulting in an unusually elevated boiling point and a substantial heat of vaporization. Ammonia is a protonic, ionizing solvent superior to virtually all but water in dissolving a wide range of electrolyte salts; some salts conduct electricity better in $NH_3$ than in water.

Yet there are differences between water and liquid ammonia. $NH_3$ liquid is known to dissolve alkali and alkaline metals to form solutions of a metallic nature when concentrated. These so-called bronzes generally possess characteristics of both electronic and ionic conductance. Such dual properties can be attractive in batteries.

These bronzes have been generally recognized as thermodynamically unstable; some literature reporting half lives as short as 190 hours. Such half lives would preclude utility in most secondary battery applications.

Ammonia is characterized by a theoretical dissociation voltage of 77 millivolts at 25° C. Such a low voltage would seem to seriously limit the use of ammonia in batteries wherein individual cell voltages of in excess of one volt are highly desired. Later evidence has indicated that the actual dissociation voltage of ammonia is significantly in excess of 77 millivolts as a result of significant electrode overvoltages. For these and other reasons, except for use in some primary batteries wherein the ammonia was introduced into the battery immediately prior to battery use, ammonia and ammonia bronzes have not been utilized extensively in batteries.

The use of sulfur as a cathode in conjunction with an ammonia solvent has been suggested since sulfur readily dissolves in ammonia. The kinetics of cell electrochemical reactions in which elemental sulfur is dissolved in ammonia together with such supporting electrolytes have been determined to be quite slow, potentially limiting current flow rates when applied to batteries. Previous proposals have attempted to utilize a sulfur cathode in conjunction with an ammonia electrolyte by the addition of compounds such as alkali metal nitrates, perchlorates, thiocyanates, and the like.

It is with cell dividers that additional difficulties with alkali or alkaline earth metal sulfur batteries have been encountered and particularly those with an ammonia electrolyte solvent. It is desirable to separate sulfur from the anode vicinity in such cells to reduce competing cell reactions. Until now, a substantially satisfactory cell separator or partition has not been developed that would (1) retain sulfur in a cell cathode compartment, (2) readily transport cell metal cations, and (3) resist both cell chemical corrosiveness and blocking by products of competing cell reactions.

DISCLOSURE OF THE INVENTION

The present invention is a method and apparatus for a rechargeable electrical storage battery and a method for operating the battery utilizing an electrochemical reaction between an alkali metal or alkaline earth metal and sulfur.

A battery made in accordance with this invention includes a housing surrounding a central chamber. A partition divides the chamber into two compartments. The partition is sealed to the housing to substantially resist movement of fluids between compartments.

A liquid anode is placed within one of the compartments and electrically connected with the outside of the housing. A cathode of a suitable or conventional type is positioned within the other compartment in electrical communication with the outside of the housing. The compartment containing the cathode also contains a catholyte fluid that includes sulfur or metal polysulfides. A provision is made for equalizing pressure between the compartments.

The liquid anode results from contacting anhydrous ammonia with a desired alkali or alkaline earth metal. In liquid anodes prepared for use in cells of this invention, the metal will be present in the anhydrous ammonia in a range of from about 50 percent of saturation to saturation of the ammonia. The catholyte is a blend of anhydrous ammonia and sulfur or anhydrous ammonia and polysulfides corresponding to the metal comprising the liquid anode or a mixture of both sulfur and metal polysulfides in anhydrous ammonia.

It is a surprising and unique aspect of this invention that this catholyte supports adequate cell current flow best absent supporting electrolytes, contrary to the thinking and practice in the prior development of batteries relying upon a reaction between an alkali or alkaline earth metal and sulfur.

The partition separating the compartments is of a type freely permeable to cations of the metal but substantially resisting passage of sulfur and metal polysulfides between the compartments. During discharge of the battery, cations of the metal are released by the liquid anode producing electrons within the anode solution. These cations pass through the partition from the anode compartment to the cathode compartment. The cations react with metal polysulfides in the cathode compartment which absorb electrons from the cathode. Upon recharging of the battery, the metal polysulfides surrender electrons to the cathode, and the metal cations pass through the partition from the cathode compartment to the anode compartment returning to the liquid anode where electrons are reabsorbed.

In a preferred embodiment, the liquid anode is formed by contacting lithium or sodium metal with anhydrous ammonia. Where sodium is dissolved in the ammonia to form the liquid anode, the sodium is present in the liquid ammonia in a concentration range of between 60 percent of saturation and saturation. Where the liquid anode is prepared by contacting lithium metal with anhydrous ammonia, the lithium metal is present in the ammonia in a range of concentration of from about 12 mole percent to about 20 mole percent.

The catholyte is prepared by blending polysulfides corresponding to the metal of the liquid anode into anhydrous ammonia. Where the liquid anode metal is sodium, the catholyte is prepared by blending sodium polysulfides in a composition range of from $Na_2S_4$ to $Na_2S_{18}$ and in a concentration of from 2 moles per liter to saturation in the ammonia. Where the liquid anode metal is lithium, the catholyte is prepared by blending lithium polysulfides in a range of composition of from $Li_2S_4$ to $Li_2S_{18}$ and in a range of concentration of from 2 moles per liter to saturation in the ammonia.

Generally, cells utilizing catholytes employing shorter chain polysulfides tend to exhibit reduced voltage and current characteristics from those utilizing longer chain polysulfides. Cells utilizing longer chain polysulfides tend to undergo more rapid decay in cell performance following successive rechargings than cells utilizing shorter chain polysulfides. Polysulfides including a range of between $Li_2S_4$ and $Li_2S_{18}$ and including a range of $Na_2S_4$ and $Na_2S_{18}$ provide a generally satisfactory compromise between cell life and cell efficiency.

In one version of a preferred embodiment, the partition is a thin sheet membrane formed from a blend of materials that include a substantial proportion of a copolymer of polyethylene and methacrylic acid or a copolymer of polypropylene and methacrylic acid or a polyethylene cation exchange membrane grafted with sulfonic or carboxylic acid. Depending upon the nature of the cell chemicals, a microporous membrane such as microporous polypropylene, microporous alumina or glass frit may be utilized. In applications employing a sodium anode metal, beta alumina ($Na_2O.xAl_2O_3$) has been found to be a particularly effective separator. It has been found that sulfur migration across the partition is a significant contributor to decay in cell performance following repeated rechargings and that the selection of a membrane for a particular cell will be governed to a large degree by its resistance to sulfur migration in the particular cell environment.

The above and other features and advantages of the invention will become apparent from the following detailed description of the invention made with reference to the accompanying drawings which form a part of the specification.

DESCRIPTION OF THE DRAWINGS

FIG. 2 is an exploded view of the cell of FIG. 1 viewed from the anode end of the cell.

FIG. 3 is an exploded view of the cell of FIG. 1 viewed from the cathode end of the cell.

FIG. 4 is a graph of cell voltage vs. time for consideration in conjunction with Example IV.

BEST MODE FOR CARRYING OUT THE INVENTION

Figure 1:
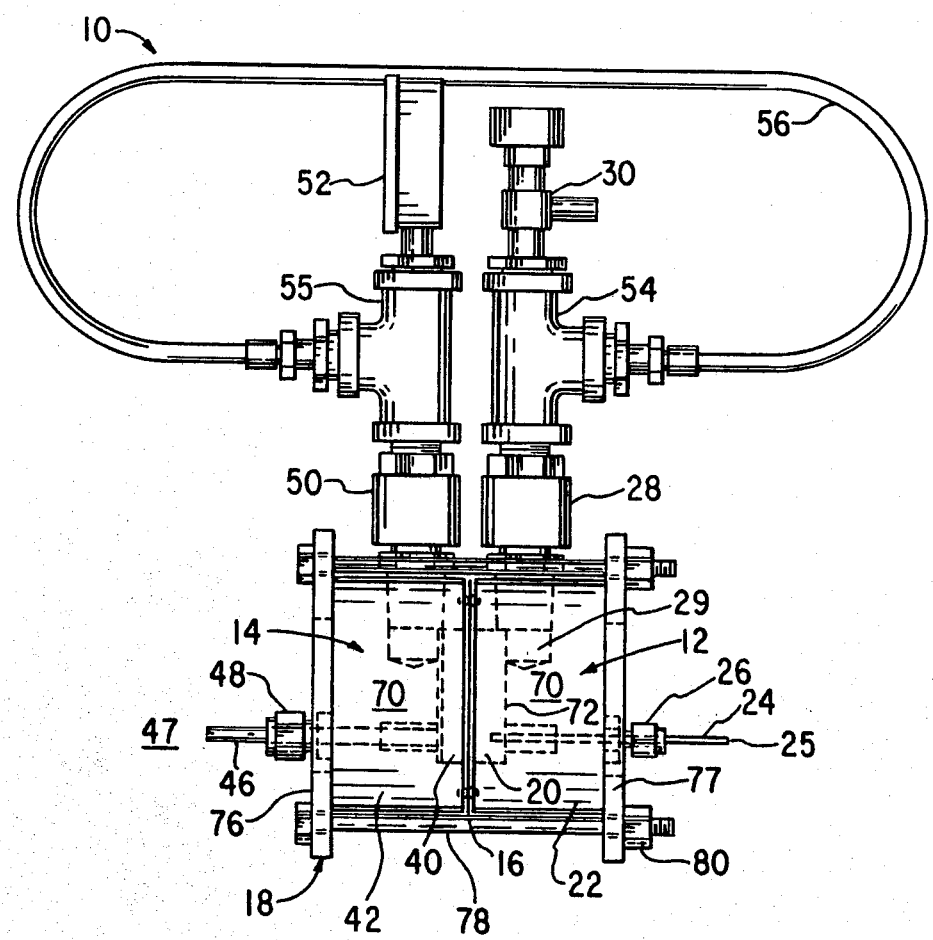
FIG. 1 is a frontal view of a battery cell made in accordance with this invention.

Referring to the drawings, an electrical storage battery cell 10 is shown in FIGS. 1-3. The cell is comprised of an anode subassembly 12, a cathode subassembly 14, a divider 16 or partition separating the subassemblies and a retaining assembly 18 joining the subassemblies. Assembled and properly filled, the cell is capable of rechargeably storing and releasing electrical current utilizing electrochemical reactions.

The anode subassembly is comprised of an anode compartment 20 formed by any suitable or conventional method within a generally cylindrical anode subhousing 22, and an anodic electrical current connection 24 or feeder between the compartment 20 and a point 25 outside of the subhousing 22. The electrical connector 24 is fabricated from a suitable or conventional material such as titanium, stainless steel or the like. A fitting 26 supports the electrical connector 24 within the anode compartment 20 and performs as a seal, cooperating with the electrical connector 24 to resist leakage of fluid contained in the anode compartment 20 along the electrical connector 24 to the exterior of the subhousing 22 while the cell 10 is assembled and in use.

A fluid inlet 28 is provided for introducing a liquid anode into the anode compartment. A fluid passage 29 communicates fluid through the subhousing 22 from the fluid inlet 28 to the anode compartment 20. A valve 30 is provided to retain fluid within the anode compartment.

The subhousing 22 includes a mating surface 31. A groove 32 of a size and shape suitable for receiving an "O" ring is formed in the mating surface.

When assembled into a cell, the anode subhousing is subject both to internal pressure generated by chemicals such as ammonia contained within the cell and to chemical attack by those contained chemicals. The housing, therefore, is formed from a material resistant to attack by chemicals contained within the cell and of a sufficient thickness and strength to withstand pressures anticipated within the anode compartment during operation of an assembled cell. In the best embodiment, the anode subhousing 22 is formed from a plastic material such as polyethylene, polypropylene, or the like.

The cathode subassembly 14 is comprised of a cathode compartment 40 formed by any suitable or conventional method within a generally cylindrical cathode subhousing 42 and a cathode 44. Like the anode subhousing 22, and for the same general considerations, the cathode subhousing 42 is formed from a plastic material such as polypropylene, polyethylene or the like of a sufficient thickness and strength to withstand pressures anticipated within the cathode compartment during operation of an assembled cell.

The cathode 44 is comprised of a generally circular metal mesh structure 45, and an electrical connector 46 fixedly supporting the mesh structure 45, and electrically communicating between the mesh structure 45 and a point 47 outside the cathode subhousing 42. A cathode seal fitting 48 retains the electrical connector 46 in a predetermined position within the cathode compartment 40, thereby positioning the mesh structure 45 within the cathode compartment 40.

In the best embodiment, the cathode 44 is a dimensionally stable electrode comprising a generally well-known valve metal such as titanium, or the like, coated with an oxidized metal coating system such as Diamond Shamrock CX-DSA, a proprietary Diamond Shamrock Corporation electrode coating system producing an electrode surface containing tin, ruthenium, and titanium oxides, or the like. Depending upon the chemicals utilized within the cell, other suitable or conventional cathode materials, including but not limited to, other valve metals coated with suitable coating systems, and carbon, may be used. Any such other cathode materials utilized must be relatively impervious to attack by chemical compounds contained or naturally occurring within the cell. Any alternate cathode materials must be of a suitable or conventional type for catalyzing the electrochemical reaction of sulfur or the alkali metal polysulfides.

A cathodic fluid inlet 50 is provided upon the cathode subhousing 42 for introducing a catholyte liquid into the cathode compartment 40. An inlet passage 51 communicates through the subhousing 42 between the fluid inlet 50 and the cathode compartment 40. A stopper 52 is provided to retain catholyte within the cathode compartment 40 when the cell is assembled. In the best embodiment, this stopper 52 also performs as a pressure gauge.

Connections 54, 55 are provided respectively on the anode fluid inlet 28 and the cathode fluid inlet 50. These connections are joined by a conduit 56 whereby pressures in the anode compartment 20 and the cathode compartment 40 can be equalized.

The cathode subhousing 42 includes a mating surface 60. A groove 61 is formed in the mating surface of a size and shape suitable for receiving an "O" ring.

The subassemblies 12, 14 are joined utilizing the retaining assembly 18 to form the electrical storage cell 10. The mating surfaces 31, 60 of the subhousings 22, 42 are pressed together joining the subhousings 22, 42 and compartments 20, 40 into a generally cylindrical housing 70 having a central chamber 72 as shown in phantom in FIG. 1. Retaining plate 76, 77 are positioned at each end of the housing and the plates are connected by strain rods 78 threaded over a portion of their length and attached to the plate, using fasteners 80. Tightening the fasteners presses the mating surfaces 31, 60 together.

The divider or partition 16 separates the anode and cathode compartments 20, 40 of the chamber 72. An "O" ring 82 is carried in one of the grooves 32, 61. The divider 16, of a size somewhat larger than a diameter of the "O" ring, is positioned between the mating surfaces 31, 60 and is then pressed into the unoccupied groove, if flexible, or against a second "O" ring 82 as the fasteners 80 are tightened to force the mating surfaces one toward the other. Interaction between the grooves 32, 61, the "O" ring 82, the second "O" ring, if used, and the divider 16 effectively seals against fluid communication between the compartments and fluid leakage from the chamber between the mating surfaces.

Typically, the anode compartment of a completed cell is charged with a liquid anode formed by contacting anhydrous ammonia with an alkali metal or alkaline earth metal such as lithium, sodium, or the like. The cathode compartment is charged with a catholyte such as ammonia containing dissolved sulfur either in the form of elemental sulfur or in the form of metal polysulfides corresponding to the anode metal. Typically where the anode metal is lithium, the corresponding polysulfide is one of, or a mixture of, polysulfides ranging in composition from $Li_2S_4$ to $Li_2S_{18}$. When the anode metal is sodium, the corresponding polysulfide is one of, or a mixture of, polysulfides ranging in composition from $Na_2S_4$ to $Na_2S_{18}$.

The divider 16 retains electrochemical reactants, that is, the liquid anode and the catholyte, within the compartments, but is freely permeable to cations of the anode metal. The divider particularly must function to retain sulfur within the cathode compartment. Sulfur entering the anode compartment reacts with the liquid anode, removing reactants from electrochemical activity within the cell, and decreasing the electrochemical capacity that can be stored within and released from the cell, as well as interfering with movement of cations through the divider.

A number of materials have been found effective in inhibiting migration of sulfur from the cathode compartment to the anode compartment while remaining freely permeable to anode cations. An effective group of partitions has been identified as polyethylene or polypropylene based cation exchange membranes that include functional groups of sulfonic or carboxylic acid such as a polyethylene cationic exchange membrane radiation grafted with sulfonated styrene, manufactured as R-5010 by RAI Research Corporation. Membranes containing a substantial proportion of a copolymer of polyethylene and acrylic or methacrylic acid, or a copolymer of polypropylene and acrylic or methacrylic acid, such as Permion®2291 40/20 or Permion®E-6001 membranes manufactured by RAI, or EAHT-1575 membranes manufactured by SAC, have been found to perform effectively as dividers. Other effective dividers have been found to be partitions having sintered glass "windows," microporous polypropylene membranes such as Cellgard®5511, Daramic® microporous membranes formed from glass filled polypropylene, dividers of ceramic alumina and elastomeric membranes including a ceramic alumina "window."

Where the anode metal is sodium, beta alumina of the formulation $Na_2O \cdot xAl_2O_3$ has been found particularly preferable, including a material known as "Beta" alumina stabilized with about 0.5 to 5% MgO or $Li_2O$ and other suitable or conventional especially conductivity enhancing stabilizers. X can range from about 5.0 to about 11. Since beta aluminas are cation conductors, sulfur migration is not a serious consideration as compared to other, microporous aluminas. Other, similar materials such as $Na_3Sc_2P_3O_{12}$, $Na_3Zr_2Si_2PO_{12}$, and $Na_2YZrP_3O_{12}$ are also believed suitable for sodium application, and together with beta aluminas are to be included in the term microporous ion conductors.

The following examples further illustrate the invention:

EXAMPLE I

A cell structure is prepared according to the best means for carrying out the invention. The cell subhousings are constructed from polypropylene. A PERMION 2291 40/20 membrane presenting a 16 square centimeter active surface to the cell is positioned between the cell subhousings to perform as a divider. The anode compartment is charged with a liquid anode prepared by contacting 18 ml of anhydrous liquid ammonia with 1.8 grams sodium. A catholyte is prepared by dissolving 2.9 grams elemental sulfur in 18 ml of anhydrous liquid ammonia. This catholyte is charged to the cathode compartment which includes a titanium substrate cathode coated with Diamond Shamrock CX-DSA, a mixture of tin, titanium, and ruthenium oxides. The cell is closed and electrically connected to a conventional testing instrument. The cell is discharged at a rate of 10 milliamperes per square centimeter of membrane surface or 160 milliamperes over a period of 2 hours. The cell voltage at the commencement of discharge is 2.1 volts and 1.78 volts at the completion of discharge. The cell is then repeatedly recharged and discharged at 160 milliamperes for periods of one hour during which recharging the voltages range between 2.4 volts and 2.6 volts. During cell discharge, the voltages range between 2.0 volts and 1.5 volts.

EXAMPLE II

A rechargeable cell is assembled in accordance with the invention including polypropylene subhousings, a titanium anodic current feeder, a titanium cathode coated with CX-DSA, and a PERMION 2291 40/20 membrane having a 16 cm² active area. 18 ml of liquid anode containing 4.76 moles lithium per liter ammonia is charged to the anode compartment, and 18 ml of catholyte containing $Li_2S_{10}$ dissolved in liquid ammonia in a concentration of 5 moles (sulfur) per liter is charged to the cathode compartment. Connected to a conventional testing instrument, the cell is discharged 4 hours at 78 milliamperes producing a voltage declining from an initial 2 volts to 1.8 volts. The cell is then repeatedly charged and discharged for 2-hour periods at 78 milliamperes with discharge voltages being generally between 2.0 volts and 1.8 volts.

EXAMPLE III

A rechargeable cell is assembled in accordance with this invention including polypropylene subhousings, a stainless steel anodic current feeder, a titanium cathode coated with CX-DSA and a PERMION 2291 40/20 membrane having an active area of 16 cm². 18 ml of liquid anode containing sodium dissolved in liquid anhydrous ammonia in a concentration of 3.73 moles per liter is charged to the anode compartment, and 18 ml of catholyte containing $Na_2S_{10}$ dissolved in anhydrous ammonia in a concentration of 5 moles (sulfur) per liter is charged to the cathode compartment. The cell is connected to a conventional current and voltage monitor and discharged at 100 milliamperes for one hour and then alternately charged and discharged at 100 milliamperes for half-hour periods with the cell voltage being between 1.9 and 2.2 volts during discharge and between 2.3 and 2.9 volts during charging.

EXAMPLE IV

A rechargeable cell is assembled in accordance with this invention including polypropylene subhousing, a stainless steel anodic current feeder, a titanium cathode coated with CX-DSA and a polyethylene cationic ion exchange membrane radiation grafted with sulfonated styrene, and having an active area of 16 cm². 18 ml of a 4.35 mole/liter solution of sodium in anhydrous liquid ammonia is charged to the anode compartment, and 18 ml of a 5 moles (sulfur)/liter solution of $Na_2S_{10}$ in liquid ammonia is charged to the cathode compartment. The cell is connected to a conventional testing instrument and is alternately discharged at 100 milliamps for 3 hours and recharged at 100 milliamps for 4 hours during which time the voltage during discharge averaged 1.70 volts, and the voltage during charge averaged 2.15 volts. FIG. 4 is a representation of typical cell voltages achieved in this example.

EXAMPLE V

A rechargeable cell is assembled in accordance with this invention including polypropylene subhousings, a stainless steel anodic current feeder, a titanium cathode coated with CX-DSA and a membrane of a copolymer of ethylene and acrylic acid having a 16 cm² area. The anode compartment was charged with 18 ml of a 4.14 mole/liter solution of sodium in liquid ammonia, and the cathode compartment was charged with 18 ml of a 5 moles (sulfur)/liter solution of $Na_2S_{10}$ in liquid ammonia. The cell is connected to a conventional testing instrument and alternately discharged and charged at 21.7 milliamperes for 14-minute periods during which time the discharge voltage averaged 1.60 and the charge voltage average 2.40 volts over 230 charge-discharge cycles.

EXAMPLE VI

A rechargeable cell is assembled in accordance with the instant invention including polypropylene subhousings, a stainless steel anodic current feeder, a titanium cathode coated with Diamond Shamrock CX-DSA, and a 0.080-inch thick α aluminum oxide partition having nominal one micron pores. The anode compartment is charged with 18 ml of a 4.1 mole per liter bronze of sodium and anhydrous $NH_3$ and the cathode compartment is charged with 18 ml of a 5 moles (sulfur) per liter solution of $Na_2S_{10}$ in anhydrous $NH_3$. Connected to a conventional testing instrument, the cell was discharged and charged for alternate 30-minute periods at a 100 milliampere rate. The cell voltages during discharge were about 1.90 volts and during charging about 2.5 volts. The cell displayed an open circuit voltage of 2.2 volts.

EXAMPLE VII

A beta″ alumina tube, generally of the configuration of a test tube and having a length of 16 cm., a diameter (O.D.) of 1.65 cm., and a wall thickness of 1.65 mm. was cradled in a cylinder of titanium cathode mesh screening having a CX® coating. The screen and cradled alumina was inserted into a polypropylene cylindrical housing of somewhat larger dimension. A ⅜" titanium rod anode was inserted into the beta" alumina tube. The tube was filled with 2.0 grams sodium dissolved in 20 mls. of NH₃, the housing with 240 mls. Na₂S₄ 5 molar (sulfur) ammonia solution. The tube, now a separator, protruded about 2.5 cm. above the liquids, thereby establishing a liquid seal between anode and cathode compartments while freeboard between the upper end of the tube and a cover placeable upon the housing permitted movement of NH₃ between compartments for equalizing pressure between the compartments. Pluggable holes in the cover permit adjustment of fluid levels within the compartments.

With anode and cathode connected to testing apparatus, the cell was cycled at 4 milliamperes/cm² measured at the anode for 100 charge-discharge cycles at a 95% current efficiency.

The cell reactions for a cell made in accordance with this invention and utilizing a catholyte containing monovalent metal polysulfides of the form $M_2S_x$ have been postulated as follows:

$$\text{at the anode: } 2M \longrightarrow 2M^+ + 2e^-$$

$$\text{at the cathode: } 2M^+ + (x-1)M_2S_x + 2e^- \longrightarrow x\,M_2S_{(x-1)}$$

for a reversible cell reaction of:

$$2M + (x-1)M_2S_x \underset{\longleftarrow}{\overset{2F}{\longrightarrow}} x\,M_2S_{(x-1)}$$

A similar cell reaction has been postulated for divalent metal polysulfides of the form $MS_x$ to wit:

$$M \longrightarrow M^{++} + 2e^-$$

$$M^{++} + (x-1)M_2S_x + 2e^- \longrightarrow x\,MS_{(x-1)}$$

for a reversible cell reaction of:

$$M + (x-1)MS_x \underset{\longleftarrow}{\overset{2F}{\longrightarrow}} x\,MS_{(x-1)}$$

Similar reactions will be apparent to those skilled in the art for cells employing catholyte containing only sulfur.

Where sodium and sodium polysulfides are utilized in constructing a cell according to the instant invention, a particular mode of saturated operation becomes highly preferable. In saturated operations, the liquid anode remains at all times saturated with sodium. This saturated state is maintained notwithstanding the extent of discharge of the cell. Naturally, the sodium bronze will, under ordinary circumstances therefore be in contact with excess solid sodium present in equilibrium with the bronze.

The presence of a saturated bronze assures that the operating pressure of the cell utilizing a sodium sulfur reaction pair will be governed by the vapor pressure of the bronze. Saturated bronze of sodium generally demonstrates a vapor pressure of between 50 and 60 psig at room temperature.

This pressure is generally balanced by a vapor pressure of the polysulfide solution on the cathode side of the cell. Such a balanced pressure is essential to preventing a pressure differential across any separator used in the cell which would be deleterious to the structural integrity of, generally fragile separators. The pressure of the saturated bronze can be exactly balanced by concentrated solutions of sodium polysulfide in liquid ammonia. For example, the pressure of a saturated bronze is balanced by a 20 molar (sulfur) solution of Na₂S₄ and also by a 25 molar (sulfur) solution of Na₂S₁₀.

An example would include a battery charged with an excess of sodium to produce a sodium bronze ammonia anolyte. It should be noted, that the anode itself is a liquid bronze notwithstanding the fact that additional solid material for fabricating or augmenting the bronze may be present in the anode compartment. Catholyte for such a cell might be a 25 molar (sulfur) ammonia solution of Na₂S₁₀. As such a battery is discharged, sodium ions migrate through the separator of such a cell towards the cathode. Reaction by the sodium ions migrating to the cathode with Na₂S₁₀ present in the cathode compartment to form shorter chain polysulfides, reduces the vapor pressure of polysulfide solution present in the cathode compartment. Consequently ammonia vaporizes from the anolyte, and transfers to the cathode compartment via the pressure equalization means thereby diluting the catholyte and effectively raising its vapor pressure. Upon discharge, it is found that the catholyte, now predominantly Na₂S₄, has been diluted to a concentration of approximately 20 molar (sulfur) and the vapor pressures continue to balance. The reverse process occurs during charging of such a sodium sulfur battery.

It should be noted that such saturated operation works well, it is believed, only with sodium-sulfur batteries. Ammonia solution pressures are not so readily balanced with other alkali metals. Such saturated operations work best with non-polymeric separators such as beta alumina. The activity of ammonia present in these saturated systems is much lower than in corresponding unsaturated systems, and polymeric materials experience difficulty in swelling with solvent so as to develop reasonable resistivities during cell operation. Such swelling difficulties do not effect, of course, ceramic type separators.

Although a single embodiment of a preferred form of the invention has been illustrated and described in detail, the present invention is not to be considered limited to the precise construction disclosed. Various adaptations, modifications and uses of the invention may occur to those skilled in the art to which the invention relates, and it is intended to cover all such adaptations, modifications, and uses which come within the spirit or scope of the appended claims.

What is claimed is:

1. A rechargeable electric storage cell comprising:
   a housing, including an internal chamber;
   a selectively permeable partition separating the chamber into two compartments and establishing a liquid seal between them, the partition being of a type that selectively permits passage of a desired charged cell chemical species therethrough;
   a liquid anode comprising one of an alkali and alkaline earth metal dissolved in anhydrous ammonia contained within one of the internal compartments, the partition being in virtually continuous contact with the liquid anode;

a cathode positioned within the other internal compartment;

an anhydrous fluid at least partially filling the cathode compartment for conducting the charged chemical species between the partition and the cathode and containing in solution polysulfides of the same metal present in the liquid anode; and a pressure equalization means communicating between said internal compartments.

2. The cell of claim 1, the liquid anode being always saturated with the metal.

3. A rechargeable electric storage cell comprising:

a housing including an internal chamber;

a partition dividing the chamber into two internal compartments, the partition being generally highly resistant to passage of chemical species therethrough but being highly receptive to the passage of a desired cationic chemical species therethrough;

a liquid seal between the partition and the housing;

a liquid anode comprising lithium alkali metal dissolved in anhydrous ammonia, the liquid anode being contained within one of the compartments and in electrical communication with the outside of the housing, the alkali metal being the cationic chemical species readily passed through the partition;

a cathode contained within the other compartment and in electrical communication with the outside of the housing;

a catholyte contained within the cathode compartment and comprising one of sulfur and alkali metal polysulfides corresponding to the alkali metal of the liquid anode, dissolved in anhydrous ammonia; and a pressure equalization means communicating between the compartments.

4. The electric storage cell of claim 3 wherein the liquid anode comprises sodium dissolved in anhydrous ammonia in a range of concentration of from 60 percent of saturation to saturation, and the catholyte comprises sodium polysulfides in a range of composition of from $Na_2S_4$ and $Na_2S_{18}$ dissolved in anhydrous ammonia within a range of concentration of from 2 moles per liter to saturation of the ammonia.

5. The electric storage cell of claim 3 wherein the liquid anode comprises lithium dissolved in anhydrous ammonia in a range of concentration of from 12 mole percent to 20 mole percent, and the catholyte comprises lithium polysulfides in a range of compositions of from $Li_2S_4$ and $Li_2S_{18}$ dissolved in anhydrous ammonia within a range of concentration of from 2 moles per liter to saturation of the ammonia.

6. The electric storage cell of claim 3 wherein the partition is a cationic exchange membrane based upon one of polyethylene and polypropylene and having functional groups selected from a group consisting of sulfonic acid, carboxylic acid, and mixtures thereof.

7. The electric storage cell of claim 3 wherein the partition includes at its principal constituent one of glass frit, sintered glass, microporous polypropylene, glass filled microporous polypropylene, and alumina.

8. The electric storage cell of claim 3, the anode metal being sodium, and the partition being a ceramic ion conductor.

9. The cell of claim 8, the liquid anode being saturated with sodium at all states of charge and discharge.

10. A rechargeable electric storage cell comprising:

a housing including an internal chamber;

a cationic exchange membrane based upon one of polypropylene and polyethylene and having functional groups selected from a group consisting of sulfonic acid, carboxylic acid and mixtures thereof, separating the internal chamber into anode and cathode compartments;

a liquid seal, the seal cooperating with the membrane and the housing to seal liquid communication between the compartments;

a liquid anode comprising sodium dissolved in anhydrous ammonia within a concentration range of from 60 percent of saturation to saturation;

a cathode contained within the cathode compartment and in electrical communication with the outside of the housing;

a catholyte comprising sodium polysulfides within a range of composition of from $Na_2S_4$ to $Na_2S_{18}$ dissolved in anhydrous ammonia within a range of concentrations of from 2 moles per liter to saturation of the ammonia; and means for equalizing pressures between the compartments.

11. A rechargeable electric storage cell comprising:

a housing including an internal chamber;

a cationic exchange membrane based upon one of polypropylene and polyethylene and having functional groups selected from a group consisting of carboxylic acid, sulfonic acid, and mixtures thereof, separating the internal chamber into anode and cathode compartments;

a liquid seal, the seal cooperating with the membrane and the housing to seal liquid communication between the compartments;

a liquid anode comprising lithium dissolved in anhydrous ammonia within a concentration range of from 12 mole percent to 20 mole percent;

a cathode contained within the cathode compartment and in electrical communication with the outside of the housing;

a catholyte comprising lithium polysulfides within a range of composition of from $Li_2S_4$ to $Li_2S_{18}$ dissolved in anhydrous ammonia within a range of concentration of from 2 moles per liter to saturation of the ammonia; and means for equalizing pressures between the compartments.

12. A rechargeable electric storage cell comprising:

a housing including an internal chamber;

a partition, the partition being one of a ceramic material and a ceramic ion conductor, the partition dividing the chamber into two internal compartments;

a seal, the seal cooperating with the partition and the housing to provide a liquid seal between the compartments;

a liquid anode comprising an alkali metal dissolved in anhydrous ammonia within a concentration range of from 50 percent of saturation to saturation;

a cathode contained within the other compartment and in electrical communication with the outside of the housing;

a catholyte comprising metal polysulfides of the form $M_2S_x$ and corresponding to the metal of the liquid anode within a range of composition of from $M_2S_4$ to $M_2S_{18}$ dissolved in anhydrous ammonia within a range of concentration of from 2 moles per liter to saturation of the ammonia; and means for equalizing pressures between the compartments.

13. The cell of claim 12 the alkali metal being sodium, the ceramic ion conductor being one of beta alumina, beta" alumina, $Na_2SC_2P_3O_{12}$, $Na_3Zr_2Si_2PO_{12}$, and $Na_2YZrP_3O_{12}$.

14. The cell of claim 13, the liquid anode being saturated with sodium at all states of charge and discharge.

15. In an electric storage cell that utilizes an electrochemical reaction in an anhydrous ammonia solvent between an anionic sulfur species and a cationic species which is an alkali metal or an alkaline earth metal and having a separator for separating an internal chamber of the cell into an anode compartment and a cathode compartment, and for transferring desired cationic chemical species between the anode and cathode compartment when the cell is in use, the separator comprising:
  a partition, the partition being of the type selectively enhancing a ready transfer therethrough of a desired charged chemical species contained within the compartments while effectively resisting transfer therethrough of other chemical species contained within the compartments;
  a support, the support retaining the partitions in a position to separate the chamber into the anode and cathode compartments; and
  a seal cooperating with the partition and the support to establish a liquid seal between the compartments, effectively restricting intermixing of liquid between the compartments.

16. In the process of operating a rechargeable electric storage cell having a reaction pair of sodium and a sodium polysulfide in an anhydrous ammonia environment, wherein the sodium and ammonia form a sodium-$NH_3$ bronze liquid anode separated from the sodium polysulfide by a cation permeable separator, the improvement comprising maintaining the bronze saturated with sodium regardless of the state of charge or discharge of the cell.

17. In the process of claim 16, the separator being made of one of beta alumina, beta" alumina, $Na_2SC_2P_3O_{12}$, $Na_3Zr_2Si_2PO_{12}$, and $Na_2YZrP_3O_{12}$.

18. In a rechargeable electric storage cell utilizing an electrochemical reaction between sulfur and one of an alkali metal and an alkaline earth metal and having two internal compartments separated by a cation permeable partition, a liquid anode being contained within one of the compartments, a cathode assembly including:
  an electrode positioned within the other internal compartment and in electrical communication with a point outside the storage cell, and
  a nonaqueous catholyte comprising a solute dissolved in anhydrous ammonia for electrochemically reacting with a cationically charged liquid anode chemical species, said solute being at least one of sulfur, a sodium polysulfide within a composition range of from $Na_2S_4$ to $Na_2S_{18}$ dissolved in the ammonia to produce a catholyte having dissolved polysulfides within a range of from 2 moles/liter to saturation of the ammonia with the sodium polysulfides, and a lithium polysulfide within a composition range of from $Li_2S_4$ to $Li_2S_{18}$ dissolved in the ammonia to produce a catholyte having dissolved polysulfides within a range of from 2 moles/liter to saturation of the ammonia with the lithium polysulfides.

* * * * *